(12) United States Patent
Grothe et al.

(10) Patent No.: US 9,566,565 B2
(45) Date of Patent: Feb. 14, 2017

(54) CATALYST MATERIAL AND PROCESS FOR THE PRODUCTION THEREOF

(75) Inventors: Sonja Grothe, Oberhausen (DE); Bernd Rohe, Moers (DE); Peter Ebbinghaus, Herten (DE); Elke Gosch, Krefeld (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 13/805,370

(22) PCT Filed: Jun. 25, 2011

(86) PCT No.: PCT/DE2011/075149
§ 371 (c)(1),
(2), (4) Date: Jan. 22, 2013

(87) PCT Pub. No.: WO2012/022328
PCT Pub. Date: Feb. 23, 2012

(65) Prior Publication Data
US 2013/0115154 A1  May 9, 2013

(30) Foreign Application Priority Data
Jun. 29, 2010 (DE) .......................... 10 2010 030 684

(51) Int. Cl.
| | | |
|---|---|---|
| B01J 23/00 | (2006.01) |
| B01J 21/06 | (2006.01) |
| B01D 53/86 | (2006.01) |
| B01J 23/22 | (2006.01) |
| B01J 23/30 | (2006.01) |

(Continued)

(52) U.S. Cl.
CPC .......... *B01J 21/063* (2013.01); *B01D 53/8628* (2013.01); *B01J 23/22* (2013.01); *B01J 23/30* (2013.01); *B01J 35/023* (2013.01); *B01J 35/108* (2013.01); *B01J 35/109* (2013.01); *B01J 35/1038* (2013.01); *B01J 35/1061* (2013.01); *B01J 37/10* (2013.01); *B01D 2255/20707* (2013.01); *B01D 2255/20723* (2013.01); *B01D 2255/20776* (2013.01); *B01D 2255/802* (2013.01); *B01D 2257/404* (2013.01); *B01J 35/004* (2013.01)

(58) Field of Classification Search
USPC .............. 502/309, 312, 350; 423/239.1, 610
See application file for complete search history.

(56) References Cited

U.S. PATENT DOCUMENTS

| | | |
|---|---|---|
| 4,085,193 A | 4/1978 | Nakajima et al. |
| 4,929,586 A | 5/1990 | Hegedus et al. |

(Continued)

FOREIGN PATENT DOCUMENTS

| | | |
|---|---|---|
| CN | 101485979 A | 7/2009 |
| DE | 102008033093 A1 | 1/2010 |

OTHER PUBLICATIONS

Yates et al., N2O formation in the ammonia oxidation and in the SCR process with V2O5-WO3 catalysts, Catalysis Today 107-108 (2005) 120-125.*

(Continued)

*Primary Examiner* — Melvin C Mayes
*Assistant Examiner* — Stefanie Cohen
(74) *Attorney, Agent, or Firm* — Cahn & Samuels, LLP

(57) ABSTRACT

A TiO2-based catalyst material in particle form having a content of metal removes pollutants, in particular of nitrogen oxides from combustion gases.

22 Claims, 4 Drawing Sheets

(51) Int. Cl.
  *B01J 35/02*   (2006.01)
  *B01J 35/10*   (2006.01)
  *B01J 37/10*   (2006.01)
  *B01J 35/00*   (2006.01)

(56) References Cited

U.S. PATENT DOCUMENTS

| | | | |
|---|---|---|---|
| 6,380,128 B1 | 4/2002 | Ji et al. | |
| 6,391,276 B1 * | 5/2002 | Suda et al. | 423/598 |
| 7,943,115 B2 * | 5/2011 | Inoue | B01J 21/06 |
| | | | 423/592.1 |
| 8,715,827 B2 | 5/2014 | Rohe et al. | |
| 2006/0084569 A1 | 4/2006 | Augustine et al. | |
| 2006/0110318 A1 * | 5/2006 | Torardi | B82Y 30/00 |
| | | | 423/610 |

OTHER PUBLICATIONS

Wang et al., Effects of ammonia/silica molar ratio on the synthesis and structure of bimodal mesopore silica xerogel, Microporous and Mesoporous Materials 71 (2004) 87-97.*

International application No. PCT/DE2011/075149, English translation of International Preliminary Report on Patentability, dated Sep. 29, 2012.

English translation of DE 102008033093.

Rentschler et al., "Optimum particle size is essential: Particle size investigations and durability of different TiO2 pigmentary and nanocrystalline powders", European Coating Journal, pp. 80-89, 4 (1999).

English Abstract of CN 101485979.
Partial English Summary of CN 101485979.

* cited by examiner

CATALYST MATERIAL AND PROCESS FOR THE PRODUCTION THEREOF

This U.S. patent application is a national stage application of PCT/DE2011/075149 filed on 25 Jun. 2011 and claims priority of German patent document 10 2010 030 684.3 filed on 29 Jun. 2010, the entirety of which is incorporated herein by reference

FIELD OF INVENTION

The invention relates to a catalyst material, more precisely a catalyst material based on $TiO_2$ having a content of metal oxides and/or metal oxide precursors, a process for the production thereof and the use thereof for the removal of pollutants, in particular nitrogen oxides, from combustion gases.

BACKGROUND OF INVENTION

Nitrogen oxides formed in combustion lead to irritation and damage to the respiratory organs (especially in the case of nitrogen dioxide), and formation of acid rain due to formation of nitric acid. In the removal of nitrogen oxides from flue gas (also known as DeNOx), nitrogen oxides such as nitrogen monoxide (NO) and nitrogen oxides ($NO_x$) are, for example, removed from the offgas of coal-fired or gas turbine power stations.

As measures for removing nitrogen oxides from the offgases, reductive processes such as selective catalytic processes (selective catalytic reduction, SCR) are known in the prior art. The term SCR refers to the technique of selective catalytic reduction of nitrogen oxides in offgases from firing plants, domestic waste incineration plants, gas turbines, industrial plants and engines.

Many such catalysts contain $TiO_2$, with the $TiO_2$ acting as catalyst itself or acting as cocatalyst in combination with transition metal oxides or noble metals. The chemical reaction over the SCR catalyst is selective, i.e. the nitrogen oxides (NO, $NO_2$) are preferentially reduced while undesirable secondary reactions (for example the oxidation of sulfur dioxide to sulfur trioxide) are largely suppressed.

There are two types of catalysts for the SCR reaction. One type consists essentially of titanium dioxide, vanadium pentoxide and tungsten oxide. The other type is based on a zeolite structure. Further metal components are also added to the two systems in the prior art.

In the case of $TiO_2$—$WO_3$—$V_2O_5$ catalysts, the $V_2O_5$ serves primarily as catalytically active species on $WO_3$-coated $TiO_2$ (in the anatase modification). The $WO_3$ coating on the $TiO_2$ is intended to function as barrier layer to prevent diffusion of vanadium into the $TiO_2$ and the associated decrease in activity and formation of rutile.

$WO_3$-doped $TiO_2$ is proposed for catalytic applications, including as DeNOx catalyst, according to the prior art as per U.S. Pat. No. 4,085,193. The process known therefrom is based on the addition of tungsten components to a titanium component such as metatitanic acid, a titanium oxyhydrate or titanium dioxide suspension) and subsequent calcination to set the surface area to about 100 $m^2/g$.

However, an additional, complicated milling step is often required before the further processing of the catalyst raw material. This is due to the fact that the tungsten-containing titanium dioxide material leaving the calcination furnace or after the heat treatment in the range from 150° C. to 800° C. is in the form of agglomerates in which the individual particles are joined to one another by sintering bridges or similar connections. In the case of relatively high-quality catalysts, in particular catalyst honeycombs having a very low web thickness, or application of the tungsten-containing titanium dioxide in the case of a "washcoat" to honeycomb bodies, milling is indispensable.

In industry, this milling process is usually carried out in a pendulum mill, e.g. a Raymond mill.

DE 102008033093 describes a process for producing a catalyst material comprising an optionally tungsten-containing titanium dioxide material, in which a titanium dioxide-containing catalyst material is produced as intermediate by milling in a roll mill, in particular a Gutbett roll mill, and the flakes leaving the roll mill as intermediate are not subjected after milling, in particular immediately afterward, to any deagglomeration and/or dispersing treatment.

The porosity of the catalyst is also of critical importance to the catalytic activity of a titanium dioxide-containing catalyst for the selective removal of nitrogen oxides from exhaust gases and offgases in the presence of ammonia. Thus, EP 516262 describes a shaped porous support composed of titanium dioxide particles alone or of a mixture of titanium dioxide particles with particles of another, porous, inorganic oxide, where the shaped support has a total porosity of 0.8 $cm^3/cm^3$ which is made up of a microporosity encompassing pores having a pore diameter of 60 nm or less of from 0.05 to 0.5 $cm^3/cm^3$ and a macroporosity encompassing pores having diameters greater than 60 nm of from 0.05 to 0.5 $cm^3/cm^3$. This catalyst support is preferably produced by mixing of materials which can be burnt out with titanium dioxide particles and shaping this mixture.

The object of the invention is thus to provide a catalyst material which displays improved properties compared to the materials known in the prior art.

SUMMARY OF INVENTION

The object is achieved by provision of a catalyst material based on $TiO_2$ in particle form having a content of metal oxide and/or precursors thereof selected from among vanadium oxide and tungsten oxide, where the average particle size D50 after dispersing is D50<1.0 μm, preferably <0.8 μm, and the volume of the mesopores (mesopore volume) of the particles is greater than 0.26 $cm^3/g$.

DETAILED DESCRIPTION OF INVENTION

Figure 1:
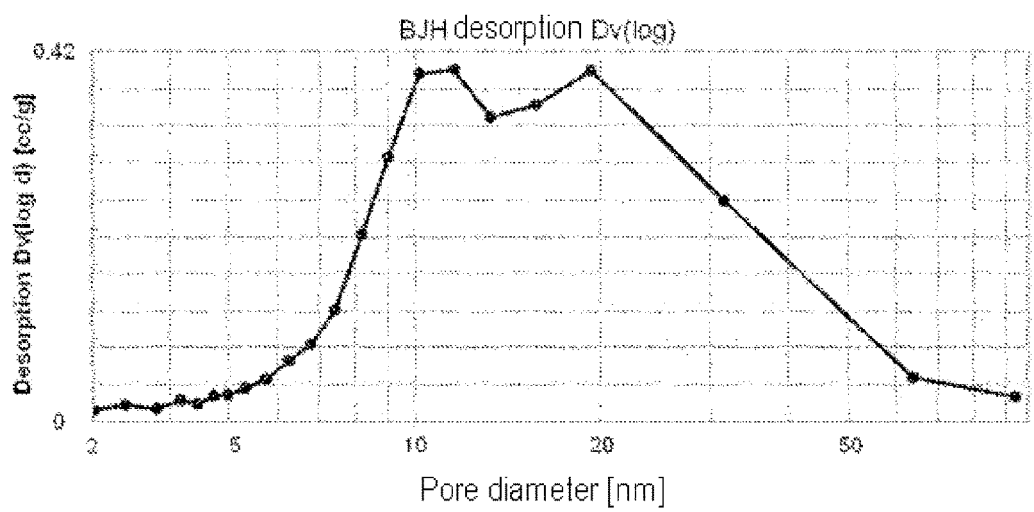
FIG. 1 shows the pore distribution of materials produced in production example 1.

To determine the mesopore volume, the method of $N_2$ porosimetry is carried out. The principle is described further below.

To determine the average particle sizes D50 after dispersing, the pulverulent catalyst material is dispersed in water by means of an ultrasonic probe (at maximum power, manufacturer: Branson Sonifier 450, use of an increase in amplitude by means of a Booster Horn "Gold", ½" titanium tube having an exchangeable, flat working tip) for 5 minutes. The particle size determination is carried out by means of laser light scattering. Here, the average particle size D50 reported is the D50 median of the volume distribution in percent by volume.

Compared to the materials known from the prior art, the catalyst material according to the invention has a higher mesopore volume, which leads to a higher catalytic activity. Furthermore, the catalyst material of the invention in the form of a tungsten-containing and/or vanadium-containing titanium dioxide displays very good dispersibility and an optimized pore distribution.

Such a tungsten-containing titanium dioxide which even as powder, e.g. before application, has an optimized pore distribution is not known in the prior art.

In a further embodiment of the catalyst material, 90% of the particles have a particle size of less than 1.5 μm and the average particle size (D50 median of the volume distribution in percent by volume, in each case determined by laser light scattering) is less than 1.0 μm.

In addition, the pores of the preferably tungsten-containing catalyst material of the invention surprisingly have a bimodal mesopore distribution having maxima in the range from 8 to 12 nm and in the range from 15 to 20 nm. The materials known from the prior art, on the other hand, generally have an approximately monomodal mesopore distribution having a main maximum at from 4 to 7 nm. The invention therefore also provides catalyst materials according to the invention based on $TiO_2$ having a bimodal mesopore distribution having a maximum in the range from 8 to 12 nm and a further maximum in the range from 15 to 20 nm.

In the description of the invention, the definition of pore sizes routine in the literature is as described, for example, in "Fundamentals of Industrial Catalytic Processes", R. J. Farrauto, C. H. Bartholomew, Blackie Academic & Professional, 1997, page 78. This document defines pores having diameters of $d_{Pore}>50$ nm as macropores, pores having $d_{Pore}=3-50$ nm as mesopores and pores having $d_{pore}<3$ nm as micropores.

The pore size distribution itself influences the shape selectivity and more rapid diffusion of the gas into and from the particles as a result of larger pore radii is made possible. This leads at the same time to a lower tendency for blockage of the pores as a result of the greater pore radii. In addition, the additional impregnation of the porous, tungsten-containing titanium dioxide with further active metal oxides (e.g. vanadium oxide) is aided by greater pore radii and a greater part of the surface area can therefore be coated with vanadium oxide and is therefore catalytically active.

To apply a, for example, tungsten-containing titanium dioxide in the form of a washcoat, the titanium dioxide is dispersed in water. The pH of the suspension is usually set to pH values of <7. The titanium dioxide is preferably milled until a defined particle size has been reached. For the purposes of the present invention, good dispersibility means that the particle size after milling is d50<1 μm, preferably d50<0.8 μm.

The particle size distribution of the (e.g. tungsten-containing) titanium dioxide in the washcoat substantially determines the mechanical properties of the finished washcoat, its adhesion to the substrate and the rheological properties of the suspension during the washcoat process. A coarse particle distribution in the washcoat can lead to poor adhesion of the washcoat to the substrate. The production of a readily dispersible (tungsten-containing) titanium dioxide without carrying out a costly milling step is not known in the prior art, but is made possible according to the invention.

As a result of the better dispersibility of the catalyst material of the invention, i.e. the lower particle size after dispersing, the adhesion of the washcoat produced is improved and the accessible surface area is increased.

The inventive catalyst material based on $TiO_2$ preferably has a content of metal oxide and/or precursors thereof of less than 30% by weight based on the total amount of titanium dioxide and metal compound used. For the purposes of the present invention, precursors thereof are, for example, hydrated forms of oxides, hydroxides, etc., which are transformed thermally into the metal oxides. A metal oxide, in particular $WO_3$, in an amount of from 8 to 15% by weight based on the total amount of titanium dioxide and metal oxide or compound used is suitable here. Particular preference is given to the metal oxide or its precursor being introduced into the catalyst material by addition of an ammonium compound such as ammonium tungstate. For the purposes of the invention, metal oxide precursors are, for example, hydrated forms of oxides, hydroxides, etc., which are transformed thermally into the metal oxides.

The inventors have discovered that the specific surface area of the catalyst material of the invention at values of 100 $m^2/g$, 200 $m^2/g$ and 300 $m^2/g$ in each case corresponds to an amount of 15% by weight, 30% by weight and 45% by weight of metal oxide, in each case based on the total amount of titanium dioxide and metal oxide and/or precursors thereof used. The invention therefore also provides catalyst materials having a content of up to 15 or 45% by weight and the corresponding specific surface area in each case.

The catalyst material of the invention can be obtained by a process in which a suspension having a content of metatitanic acid $TiO(OH)_2$ of preferably from 200 to 400 g of $TiO_2$/l is initially charged, the suspension is brought to a pH in the range from 3 to 8 and, after a ripening time, preferably in a temperature range from 60 to 100° C. for a period of up to 180 minutes, is subjected to a hydrothermal treatment, preferably in the temperature range from 150 to 300° C. for a period of up to 24 hours, the suspension obtained is washed and filtered and the particulate material filtered off is dried, with a soluble compound of the metal being added to the suspension during the course of the process.

The addition of the soluble metal compound can be carried out before or after the hydrothermal treatment, and addition before setting of the pH to the range from 3 to 8 is also possible. The addition of the soluble metal compound preferably takes place after the pH adjustment before the hydrothermal treatment. However, it is also possible to carry out the addition of the metal compound in a plurality of steps, i.e. to add partial amounts both before and after the hydrothermal treatment.

As soluble metal compound, it is possible to use a compound which is transformed thermally into a catalytically active metal oxide and/or metal oxide precursor, e.g. into $SnO_2$, $CeO_2$, $VO_N$, $CrO_x$, $MoO_x$, $WO_x$, $MnO_x$, $FeO_x$ and NiO and CoOx. According to the invention, particular preference is given to adding a vanadium compound and/or tungsten compound, preferably in the form of a vanadate or tungstate. Very particular preference is given to the use of ammonium metatungstate.

The setting of the pH can, according to the invention, be carried out using any neutralizing agent, but preference is given to the use of ammonia since, in particular, the introduction of alkali metal ions is avoided.

Phosphoric acid can optionally be added before setting of the pH. This increases the thermal stability of the end product.

Ammonium sulfate can optionally be added after the hydrothermal treatment. This makes targeted setting of the sulfate content possible. This makes it possible for the thermal stability and the catalytic activity to be increased further.

The invention thus makes it possible to overcome the disadvantages of the materials of the prior art and, in particular, to provide a process for producing a $TiO_2$-containing catalyst material which leads to catalyst materials based on $TiO_2$ in the anatase form, with the catalyst material having good dispersibility and a bimodal mesopore distribution.

In the opinion of the inventors, this is made possible essentially by the use of the hydrothermal process. Here, unlike in the case of ignition, the $TiO_2$ (present as titanium oxide hydrate) is introduced after filtration and washing and setting of the pH of the suspension to pH 3-8 into a pressure vessel (autoclave) and maintained at temperatures of >100° C. for a period of from one hour to a plurality of (e.g. 5) days. This process step is referred to as hydrothermal treatment (cf. also Ullmanns Enzyklopädie der Technischen Chemie, 4th edition, 1978, Volume 15, p. 117ff: K. Recker, growing single crystals). A preferred period of time for the hydrothermal treatment of the $TiO_2$ (present as titanium oxide hydrate) is from 2 to 24 hours, particularly preferably from 4 to 8 hours. In this way, more homogeneous crystal growth can be achieved in the aqueous suspension by the hydrothermal treatment with stirring, since in contrast to calcination no "hot spots" occur.

The catalyst material which can be obtained by the process of the invention can, particularly as dried material, be used further directly and generally does not have to be subjected to milling.

The process of the invention can therefore, in summary, provide the following process steps:
- initial charging of the starting material in the form of a titanium oxide hydrate suspension
- optional addition of phosphoric acid
- optional addition of a preferably water-soluble metal compound, in particular a tungsten compound (very particularly preferably ammonium metatungstate)
- adjustment of the pH to pH 3-8 (in particular with the aid of ammonia)
- optional addition of a preferably water-soluble metal compound, in particular a tungsten compound (very particularly preferably ammonium metatungstate)
- ripening time
- hydrothermal treatment
- filtration and washing
- optional addition of ammonium sulfate
- optional addition of a preferably water-soluble metal compound, in particular a tungsten compound (very particularly preferably ammonium metatungstate)
- drying (preferably spray drying or milling-drying)
- optional milling.

The addition of the metal compound, in particular a tungsten compound, is possible according to the invention in various process stages. Thus, partial amounts of the total amount of tungsten component can be added in various process stages, e.g. before setting of the pH and before the hydrothermal treatment. It has surprisingly been found that a catalyst material produced in this way has good dispersibility and a bimodal mesopore distribution.

Figure 2:
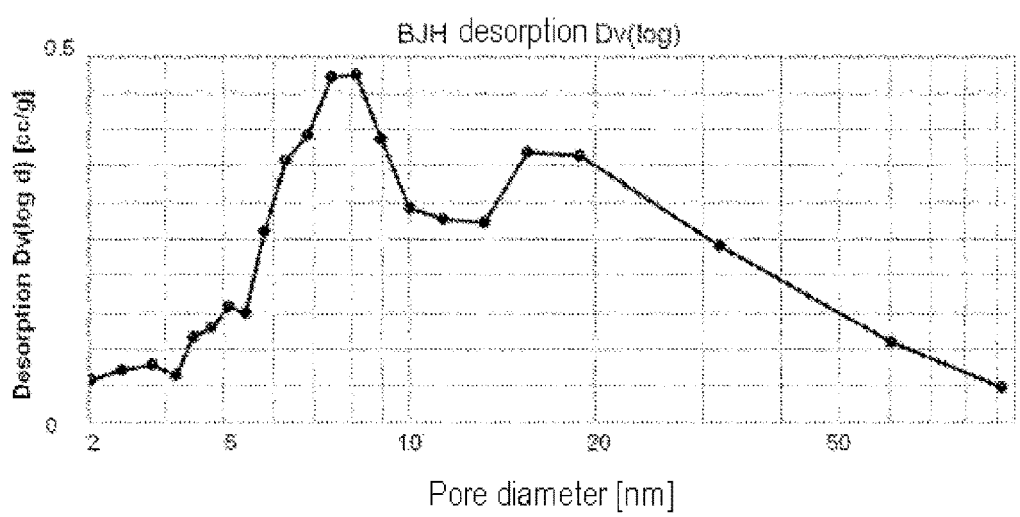
FIG. 2 shows the pore distribution of materials produced in production example 2.
Figure 3:
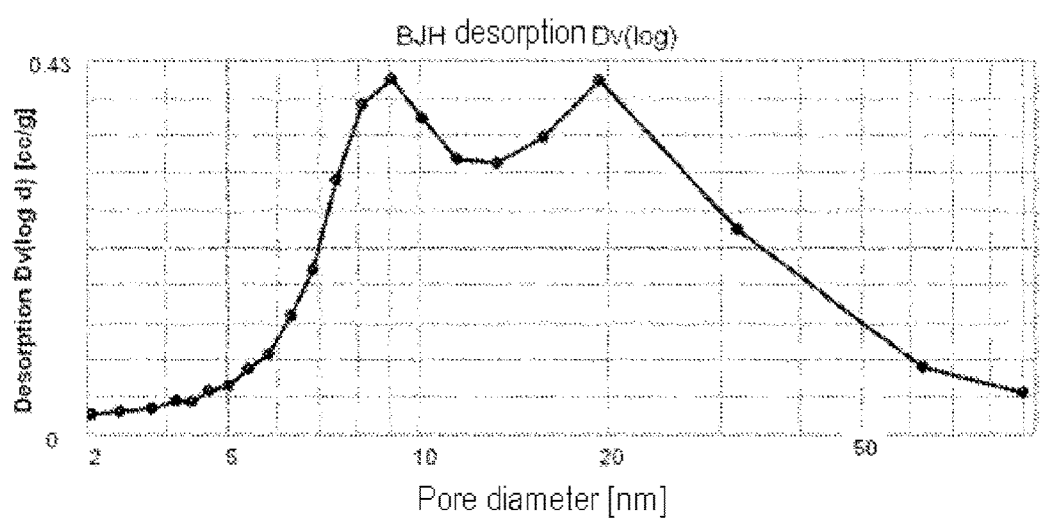
FIG. 3 shows the pore distribution of materials produced in production example 3.
Figure 4:
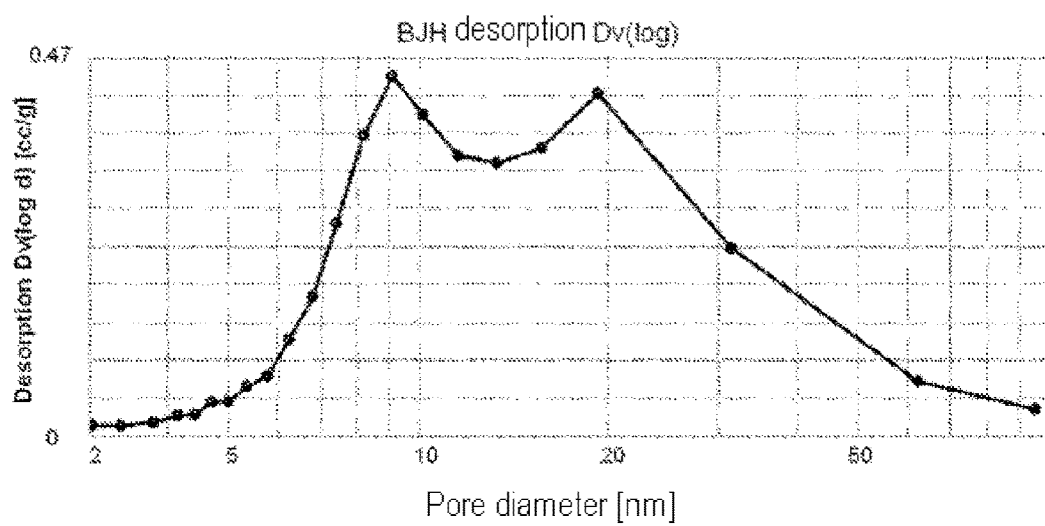
FIG. 4 shows the pore distribution of materials produced in production example 4.
Figure 5:
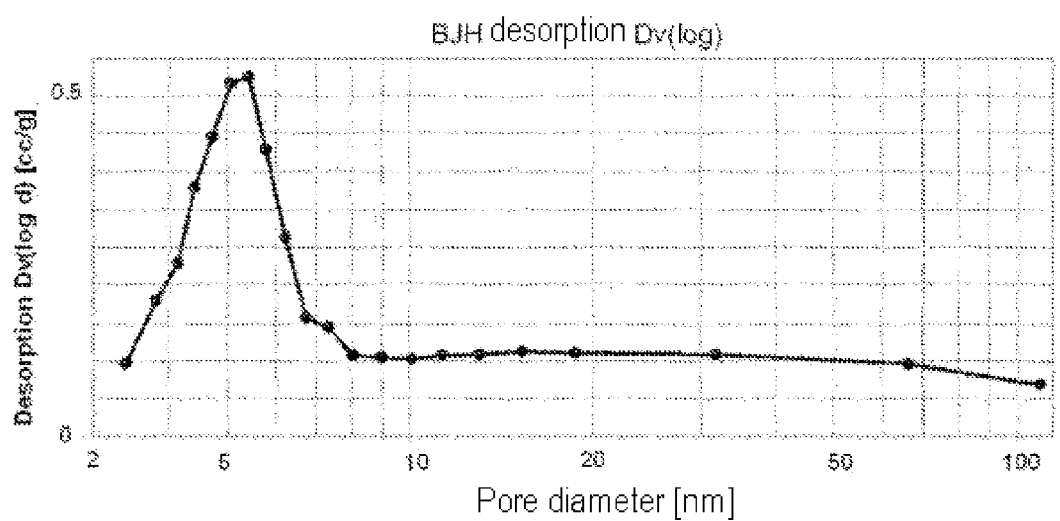
FIG. 5 shows the pore distribution of materials produced in comparative example 1.
Figure 6:
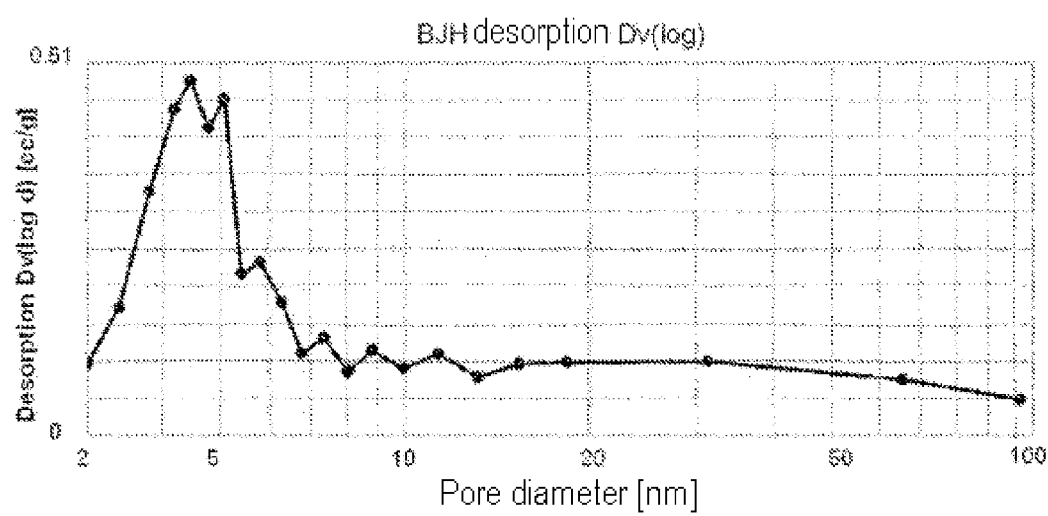
FIG. 6 shows the pore distribution of materials produced in comparative example 2.
Figure 7:
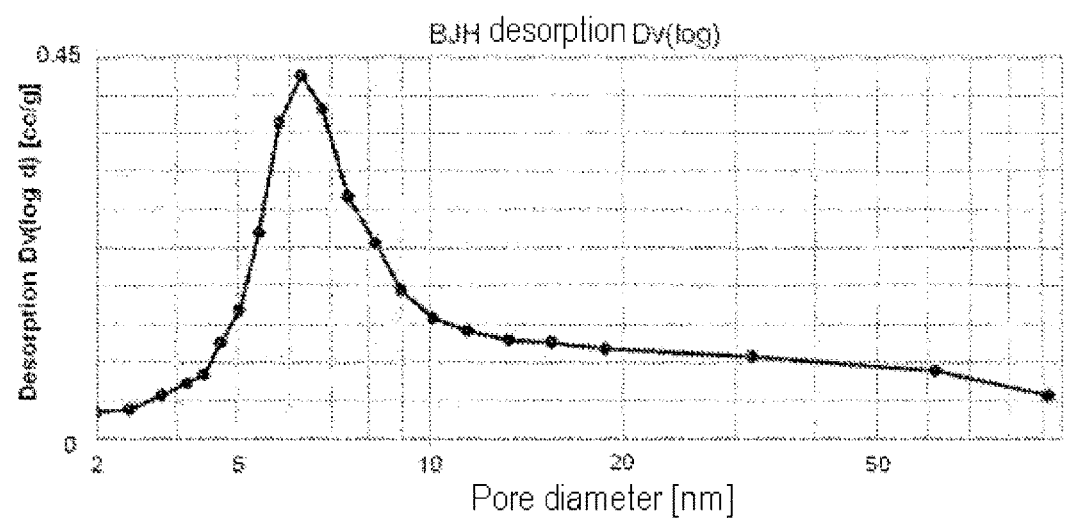
FIG. 7 shows the pore distribution of materials produced in comparative example 3.
Figure 8:
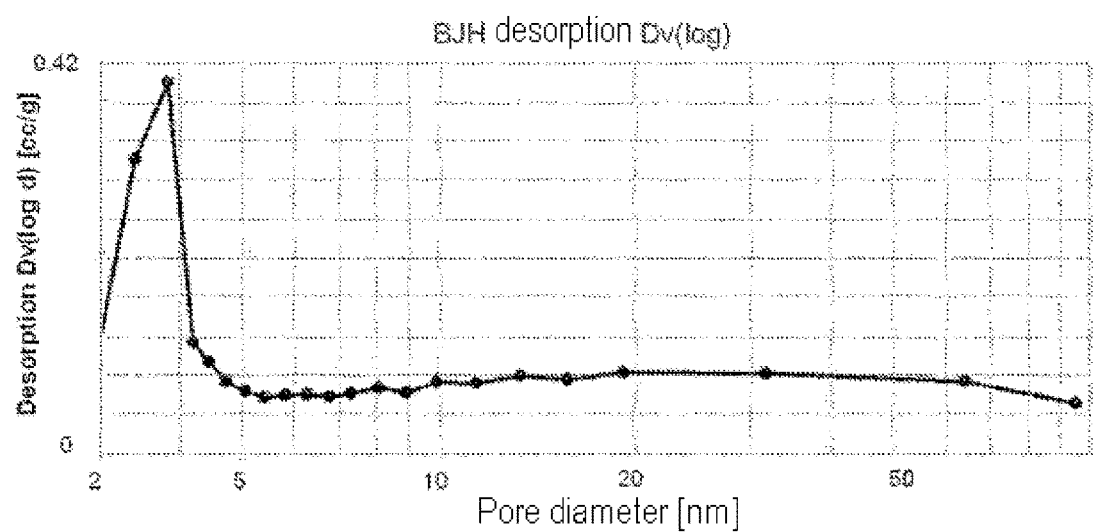
FIG. 8 shows the pore distribution of materials produced in comparative example 4.

The invention is illustrated with the aid of the following experiments and comparative experiments and also FIGS. 1-8.

PRODUCTION EXAMPLES ACCORDING TO THE INVENTION

As starting materials the following materials were used:

| Materials | Remarks | Concentration |
| --- | --- | --- |
| Titanium oxide hydrate suspension | $TiO(OH)_2$ or $TiO_2$ in the anatase modification | 358 g of $TiO_2$/l |
| Ammonium metatungstate soln. (AMT) | prepared from AMT (H.C. Starck, Lot. AMW01706) containing 91.36% of $WO_3$, dissolved at RT | 39.4% of $WO_3$ |
| Phosphoric acid | AR grade, from Merck | 89% strength, $\rho$ = 1.75 g/ml |
| Ammonia | AR grade, from Merck | 25% strength |

Production Example 1

5.6 l of the abovementioned titanium oxide hydrate suspension were introduced into a 10 l glass beaker and diluted with 1067 g of TE water. The mixture was heated to 60° C. while stirring. The pH was set to pH=8.0 by addition of aqueous ammonia solution. About 5800 ml of suspension were placed in a 10 l pressure vessel. The suspension was HT-treated at about 180° C. and 10 bar for 4 hours. After cooling overnight, the suspension was still at about 65° C. The suspension was filtered. The solid was washed with about 8 l/kg of $TiO_2$ ($\hat{=}$13.1 l) of TE water. The filtercake was slurried with TE water and the suspension was admixed with 476 g of AMT solution while stirring. Since the suspension thickened during the addition, it was diluted to about 7 l with TE water. The suspension was spray dried. The results are given in table 1 below.

Production Example 2

5.6 l of the abovementioned titanium oxide hydrate suspension were introduced into a 10 l glass beaker and diluted with 1067 g of TE water. The pH was then set to pH=3.0 by means of aqueous ammonia solution. The mixture was heated to 60° C. while stirring and firstly maintained at this temperature for 1 hour. 828 g of AMT solution were subsequently added. About 5800 ml of suspension were placed in a 10 l pressure vessel. The suspension was HT-treated at about 180° C. and 10 bar for 4 hours. After cooling overnight, the suspension was still at about 65° C. The suspension was filtered. The solid was washed with about 6 l/kg of $TiO_2$ ($\hat{=}$10 l) of TE water. The filtercake was slurried with TE water to about 5 l and the suspension was spray dried.

Production Example 3

5.6 l of the abovementioned titanium oxide hydrate suspension were introduced into a 10 l glass beaker and diluted with 1067 g of TE water. 16 ml of phosphoric acid were added (pH 1.8). The mixture was heated to 60° C. while stirring (pH 1.4). 354 ml of ammonia were than added over a period of about 24 minutes (15 ml/min) to the suspension in order to set the pH to 5.0. About 5800 ml of suspension were placed in a 10 l pressure vessel. The suspension was HT-treated at about 180° C. and 10 bar for 4 hours. After cooling over the weekend, the suspension was still at about 25° C. The suspension was filtered. The solid was washed with about 6 l/kg of $TiO_2$ ($\hat{=}$10 l) of TE water. The filtercake was slurried with TE water and the suspension was admixed with 476 g of AMT solution while stirring. Since the suspension thickened during the addition, it was diluted to about 7 l with TE water. The suspension was spray dried.

Production Example 4

1955 ml of the abovementioned titanium oxide hydrate suspension were introduced into a 10 l glass beaker and diluted with 5045 g of TE water. 5.6 ml of phosphoric acid were added (pH 1.8). The mixture was heated to 60° C. while stirring (pH 1.7). 125 ml of ammonia were than added over a period of about 8 minutes (15 ml/min) to the suspension to set the pH to 6.9. About 5600 ml of suspension were placed in a 10 l pressure vessel. The suspension was HT-treated at about 180° C. and 10 bar for 4 hours. After cooling overnight, the suspension was still at about 60° C. The solid was washed with about 2 l/kg of $TiO_2$ ($\hat{=}$1.1 l) of TE water. The filtercake was slurried with TE water and the suspension was admixed with 164 g of AMT solution while stirring. Since the suspension thickened during the addition, it was diluted to about 3.5 l with TE water. The suspension was spray dried.

Table 1 shows the analyses of the products of production examples 1 to 4 and the determination of the surface area, the pore size and the thermal stability.

TABLE 1

Production examples 1 to 4

| | Process | 1 | 3 | 2 | 4 |
|---|---|---|---|---|---|
| Pore volume | $N_2$ Ads./ Total | 0.350 $cm^3/g$ | 0.276 $cm^3/g$ | 0.300 $cm^3/g$ | 0.294 $cm^3/g$ |
| Mesopore volume | $N_2$ Ads./ BJH | 0.340 $cm^3/g$ | 0.274 $cm^3/g$ | 0.297 $cm^3/g$ | 0.293 $cm^3/g$ |
| Pore diameter | $N_2$ Ads./ BJH Des. | 8.1 to >15.6 nm* | 11.5 to >19.3 nm* | 9.0 to >19.2 nm* | 9.0 to >19.3 nm* |
| Spec. surface area of end product | | 128 $m^2$ | 73.9 $m^2$ | 88.6 $m^2$ | 83.4 $m^2$ |
| d50 Helos UF | | 0.68 μm | 0.46 μm | 0.51 μm | 0.47 μm |
| B90/10 Helos UF | | 0.94 μm | 0.78 μm | 0.83 μm | 0.80 μm |

To determine the mesopore volume, the method of $N_2$ porosimetry is carried out, as mentioned above. The principle is described, for example, in "Fundamentals of Industrial Catalytic Processes", R. J. Farrauto, C. H. Bartholomew, Blackie Academic & Professional, 1997, page 122. For the sample preparation, the samples were dried under defined conditions (16 hours under reduced pressure and 1 hour under reduced pressure at T=180° C.). For the measurement, use is made of, for example, the measuring instrument "Autosorb-6" from Quantachrome. To determine the mesopore volume, the evaluation by the BJH method (as per Barret, Joyner and Halenda) is carried out.

The pore distribution of the materials produced in production examples 1 to 4 is shown in the accompanying FIGS. 1 to 4.

Comparative Experiments

In the same way as in the production examples according to the invention, the suspensions of titanium oxide hydrate were made up in the comparable concentrations for comparative experiments 1 to 4 and treated as indicated in table 2 below. As starting materials, use was made of the following materials:

| Materials | Remarks | Concentration |
|---|---|---|
| Titanium oxide hydrate suspension | $TiO(OH)_2$ or $TiO_2$ in the anatase modification | 386 g of $TiO_2$/l |
| Ammonium metatungstate soln. (AMT) | prepared from AMT (H.C. Starck, Lot. AMW01706) containing 91.36% of $WO_3$, dissolved at RT | 40% of $WO_3$ |
| Phosphoric acid | AR grade, from Merck | 89% strength ρ = 1.75 g/ml |
| Ammonia | AR grade, from Merck | 25% strength |

Comparative Example 1

1815 ml of the abovementioned titanium oxide hydrate suspension were introduced into a 5 l glass beaker and diluted with 1815 ml of water. A pH of 1.7 was measured. The pH was set to 6.8 by means of ammonia while stirring. The mixture was stirred at RT for 2 hours. The suspension was filtered with suction and the solid was washed with 5.6 l of TE water (=8 l/kg of $TiO_2$). The filtercake (1810.4 g=38.67% of $TiO_2$) was divided. 776.0 g of filtercake were dispersed in TE water by means of a high-speed mixer and diluted to about 1.5 l. The 83.25 g of AMT solution were added dropwise over a period of 15 minutes while stirring. The mixture was stirred for a further 1 hour at RT. The suspension was introduced into a porcelain dish. Tray drying at 150° C. was carried out overnight. Ignition at 460° C. was carried out. The product was milled.

Comparative Example 2

The remaining filtercake from comparative example 1 was dried overnight at 150° C. in a drying oven, ground in a mortar and divided into two halves. One half was mixed with 55.6 g of AMT solution. Ignition was carried out at 460° C. in a Nabertherm furnace. The product was milled.

Comparative Example 3

The second half from comparative example 2 was calcined at 460° C. in a Nabertherm furnace. It was then mixed with 55.6 g of AMT solution. The product was milled.

Comparative Example 4

The after-treatment was carried out in a 5 l laboratory reactor. For this purpose, 1500 ml of the abovementioned titanium oxide hydrate suspension were introduced into the product vessel and diluted with 1500 ml of water.
After-Treatment Conditions:
Temperature before and during
AMT addition: 80° C.
AMT addition: over a period of 20 minutes (160.8 g)
Temperature after AMT addition: boiling point
Ripening: 2 h at boiling point
$H_3PO_4$ addition: after ripening at about 90° C. (6.17 g)

Further stirring after H₃PO₄ addition: about 30 minutes with cooling to about 40° C.
pH of the suspension: 1.0

The suspension was filtered with suction. The filtercake was tray dried at 150° C. The product was ignited at 460° C. and subsequently milled using a Braunmix milling attachment.

TABLE 2

Comparative experiments 1 to 4

| Expt. No. | | 1 | 2 | 3 | 4 |
|---|---|---|---|---|---|
| Pore volume | N2 Ads./Total | 0.254 cm³/g* | 0.225 cm³/g* | 0.198 cm³/g* | 0.246 cm³/g* |
| Meso-pore volume | $N_2$ Ads./BJH | 0.250 cm³/g* | 0.216 cm³/g* | 0.191 cm³/g* | 0.225 cm³/g* |
| Pore diameter | $N_2$ Ads./average | 9.2 nm | 7.6 nm | 9.6 nm | 6.7 nm |
| Pore diameter | $N_2$ Ads./BJH Des. | 5.1 to >50 nm | 4.4 to >50 nm | 6.3 to >50 nm | 3.8 to >50 nm |
| Spec. surface area of end product | $N_2$ Ads./5P-BET | 111 m²/g | 119 m²/g | 82.7 m²/g | 146 m²/g |
| d50 Helos UF | | 1.03 μm | 1.05 μm | 1.03 μm | 1.01 μm |
| B90/10 Helos UF | | 1.54 μm | 1.60 μm | 1.53 μm | 1.52 μm |

The pore distribution of the materials produced in comparative examples 1 to 4 is shown in the accompanying FIGS. 5 to 8.

As can be seen from a comparison of the results of the production examples and the comparative examples, the materials according to the invention have improved properties in respect of particle diameter, pore size and pore diameter compared to materials produced according to the prior art.

The invention claimed is:

1. A catalyst material comprising:
   TiO₂ in particle form having a content of metal oxide of vanadium oxide, tungsten oxide, and/or precursors thereof,
   wherein the average particle size $D_{50}$ after dispersing is $D_{50}$ less than 1.0 μm, the mesopore size is 3-50 nm and the mesopore volume of the particles is greater than 0.260 cm³/g, and
   wherein the B90/10 value is in a range of 0.78-0.94 μm.
2. The catalyst material based on TiO₂ as claimed in claim 1 having a content of metal oxide and/or precursors thereof in an amount of less than 30% by weight based on the total amount of titanium dioxide and metal oxide used.
3. The catalyst material based on TiO₂ as claimed in claim 1 having a content of vanadium oxide, tungsten oxide, and/or precursors thereof in an amount of from 8 to 15% by weight of the total amount of titanium dioxide and vanadium oxide or tungsten oxide used.
4. A process for producing the catalyst material as claimed in claim 1,
   wherein an aqueous suspension having a content of titanium oxide hydrate TiO(OH)₂ is initially charged, the suspension is brought to a pH in the range from 3 to 8 and,
   after a ripening time, is subjected to a hydrothermal treatment, the suspension obtained is washed and filtered and the particulate material filtered off is dried, with a soluble compound of vanadium or tungsten being added to the suspension during the course of the process.
5. The process as claimed in claim 4, wherein the addition of the soluble compound of the metal is carried out before the hydrothermal treatment.
6. The process as claimed in claim 5, wherein the addition of the soluble compound of the metal is carried out after adjustment of the pH to the range 3-8 and before the hydrothermal treatment.
7. The process as claimed in claim 4, wherein a vanadium compound or tungsten compound is added as metal.
8. The process as claimed in claim 4, wherein the suspension is brought to a pH in the range from 3 to 8 by ammonia.
9. A process as claimed in claim 4, wherein the aqueous suspension having a content of 200 to 400 g of TiO₂/l is initially charged and brought to a pH in the range from 3 to 8.
10. The process as claimed in claim 7, wherein a vanadium compound or tungsten compound in the form of a vanadate or tungstate is added as metal.
11. The process as claimed in claim 7, ammonium metatungstate is added as metal.
12. An offgas catalyst comprising a catalyst material as claimed in claim 1.
13. A photocatalyst comprising a catalyst material as claimed in claim 1.
14. A method of removing pollutants comprising contacting a catalyst material as claimed in claim 1 with an offgas, thereby removing nitrogen oxides.
15. A catalyst material according to claim 1, wherein the average particle size $D_{50}$ after dispersing is less than 0.8 μm.
16. A catalyst material comprising:
   TiO₂ in particle form having a content of metal oxide of vanadium oxide, tungsten oxide, and/or precursors thereof,
   wherein the average particle size $D_{50}$ after dispersing is $D_{50}$ less than 1.0 μm, the mesopore size is 3-50 nm and the mesopore volume of the particles is greater than 0.260 cm³/g, said catalyst material having a bimodal mesopore distribution having a first maximum in a range from 8 to 12 nm and a second maximum in a range from 15 to 20 nm.
17. A catalyst material according to claim 1, comprising:
   TiO₂;
   15-45 wt % of the metal oxide selected from the group consisting of vanadium oxide, tungsten oxide, and combinations thereof, based on the total weight of TiO₂ and metal oxide,
   wherein said catalyst has a surface area of 100-300 m²/g.
18. A catalyst material according to claim 1, comprising:
   TiO₂;
   30-45 wt % of the metal oxide selected from the group consisting of vanadium oxide, tungsten oxide, and combinations thereof, based on the total weight of TiO₂ and metal oxide, and
   wherein said catalyst has a surface area of 200-300 m²/g.
19. The catalyst material based on TiO₂ as claimed in claim 16 having a content of metal oxide and/or precursors thereof in an amount of less than 30% by weight based on the total amount of titanium dioxide and metal oxide used.

20. The catalyst material based on $TiO_2$ as claimed in claim 16 having a content of vanadium oxide, tungsten oxide, and/or precursors thereof-in an amount of from 8 to 15% by weight of the total amount of titanium dioxide and vanadium oxide or tungsten oxide used.

21. An offgas catalyst comprising a catalyst material as claimed in claim 16.

22. A photocatalyst comprising a catalyst material as claimed in claim 16.

* * * * *